United States Patent [19]

Tominaga

[11] Patent Number: 4,938,327

[45] Date of Patent: Jul. 3, 1990

[54] MOTOR-POWERED DRIVE DEVICE

[75] Inventor: Tsutomu Tominaga, Hyogo, Japan

[73] Assignee: Mitsubishi Denki Kabushiki Kaisha, Tokyo, Japan

[21] Appl. No.: 363,004

[22] Filed: Jun. 8, 1989

[30] Foreign Application Priority Data

| Jun. 8, 1988 | [JP] | Japan | 63-141000 |
| Jun. 8, 1988 | [JP] | Japan | 63-141001 |
| Jun. 13, 1988 | [JP] | Japan | 63-145168 |
| Jul. 8, 1988 | [JP] | Japan | 63-171511 |

[51] Int. Cl.$^5$ ............... B60K 31/02; F16D 27/112
[52] U.S. Cl. ............... 192/0.02 R; 192/84 C; 180/178; 123/361
[58] Field of Search ............... 192/0.02 R, 84 R, 84 C; 180/170, 178, 179; 123/350, 361

[56] References Cited

U.S. PATENT DOCUMENTS

| 4,163,432 | 8/1979 | Hertfelder | 123/361 |
| 4,237,742 | 12/1980 | Barthruff | 180/178 X |
| 4,343,385 | 8/1982 | Kosuda et al. | 192/0.02 R |
| 4,360,089 | 11/1982 | Matsui et al. | 180/170 X |
| 4,385,675 | 5/1983 | Blee | 180/178 |
| 4,809,656 | 3/1989 | Suzuki | 123/361 |

FOREIGN PATENT DOCUMENTS

| 63-20240 | 1/1988 | Japan | 180/170 |
| 64-47628 | 2/1989 | Japan | 180/170 |

Primary Examiner—Richard Lorence
Attorney, Agent, or Firm—Sughrue, Mion, Zinn Macpeak & Seas

[57] ABSTRACT

In a motor-powered drive device for controlling, for example, a throttle valve of an internal combustion engine, a reduction gear mechanism is separated from an electromagnetic clutch mechanism by a base plate and magnetic flux leakage to portions other than the clutch mechanism is prevented by non-magnetic members. A one-way clutch is provided for preventing buckling of return springs.

7 Claims, 5 Drawing Sheets

MOTOR-POWERED DRIVE DEVICE

BACKGROUND OF THE INVENTION

The present invention relates to an electric motor-powered drive device for reducing the revolutions of an electric motor and transmitting the reduced revolutions to an output shaft through an electromagnetic clutch.

In more particularly, the present invention relates to a motor-powered drive device for use as, for example, a drive device for driving a throttle valve of an internal combustion engine to transmit a drive force of a motor through a reduction mechanism and an electromagnetic clutch to an output shaft of the motor-powered drive device.

FIG. 1 is a cross section of a conventional electric motor powered drive device and FIG. 2 is a cross section taken along a line II—II in FIG. 1. In these figures, an electric motor 1 has an output shaft on which a pinion 2 is provided. A stepped gear 3 includes a large gear 3a meshed with the pinion 2 and a small gear 3b meshed with an output gear 5. The pinion 2, the stepped gear 3 and the output gear 5 constitute a reduction gear mechanism. A clutch rotor 6 has an outer periphery formed with the output gear 5 and rotatably supported on an output shaft 10 through a bearing 10a. A movable clutch plate 7 faces toward the rotor 6 and is provided on a side end of a flange 9 fixed to the output shaft 10 through leaf return springs 8. A clutch yoke 11 rotatably supports the output shaft 10 through a bearing 10b and forms a magnetic circuit of an electromagnetic clutch 13. A coil 12 is wound on the yoke 11. A rotary lever 14 is fixed to an end of the output shaft 10 by a nut 15 and has a groove 14a in which a wire 16 for driving an external load is wound. A return spring 17 is provided for biasing the rotary lever 14 in clockwise direction when viewed in the direction of the arrow in FIG. 1. A potentiometer 18 is coupled with the output shaft 10 and provides a resistance value corresponding to a rotation angle thereof. Reference numerals 19 and 20 denote housing portions of the drive device and 21a and 21b are stoppers for restricting rotation of the rotary lever 14.

The operation of the above-noted device will now be described. When a voltage is applied to the motor 1, it rotates and a rotation force is transmitted through the pinion 2 and the stepped gear 3 to the output gear 5. Under such a condition, when there is no current flowing through the coil 12 of the electromagnetic clutch 13, the clutch rotor 6 rotates freely with respect to the output shaft 10, so that no rotational driving force is transmitted to the output shaft 10. When current is supplied through the coil 12, the movable clutch plate 7 is magnetically attracted by the rotor 6, so that the rotational force of the rotor 6 is transmitted through the movable clutch plate 7 and the flange 9 to the output shaft 10 to rotate the latter. A control circuit (not shown) responds to a rotation angle (desired value) of the rotary lever 14 to drive the motor 1 to thereby rotate the output shaft 10 through the electromagnetic clutch 13. The rotation angle of the output shaft 10 can be detected as a variation of the resistance value of the potentiometer 18 coupled with the output shaft 10. Further, since the control circuit drives the motor 1 until the resistance value (control amount) of the potentiometer 18 coincides with the desired value, a desired rotation angle of the rotary lever 14 can be obtained.

Since the conventional motor-powered drive device is constructed as mentioned above, grease lubricant on the output gear 5 formed on the clutch rotor 6 tends to be scattered to the magnetic attracting plane of the rotor 6, so that the friction force is reduced and the transmission torque of the electromagnetic clutch 13 is substantially reduced.

Further, the magnetic flux produced by the current flowing through the coil 12 leaks to the clutch rotor 6, the output shaft 10 and the flange 9 which are formed of magnetic material. As a result, the effective flux passing through the attracting plane between the clutch rotor 6 and the movable clutch 7 is reduced, resulting in a reduction of the transmission torque of the electromagnetic clutch.

In such a motor-powered drive device, in order to shorten the time necessary to rotate the rotary lever 14 to the desired rotation angle, a possibility of over-rotation of the rotary lever 14 tends to increase. In the conventional motor-powered drive device, in which the movable clutch plate 7 is coupled through the leaf return springs 8 to the clutch plate 7 of the electromagnetic clutch 13 and a compression force is exerted on the return springs 8 when the clutch rotor 6 is driven in the clockwise direction when viewed from the left side in FIG. 1, the compression force becomes large when the rotary lever 14 is prevented from further rotation by the stopper portion, resulting in a buckling of the rotary lever 14.

Further, the drive torque of the motor 1 acts to compress the return springs 8 when an over-rotation of the rotary lever 14 is restricted by the stopper portion 21a during clockwise rotation. As a result, the return spring 8 is buckled.

SUMMARY OF THE INVENTION

An object of the present invention is to provide a motor-powered drive device in which flux leakage to the output shaft and the flange is reduced and thus the transmission torque of the electromagnetic clutch is increased.

Another object of the present invention is to provide a motor-powered drive device in which the buckling of the return spring due to compression force is prevented and the reliability of the electromagnetic clutch is improved.

A further object of the present invention is to provide a motor-powered drive device in which the compressive force exerted on the return spring is cancelled out to realize a highly reliable electromagnetic clutch.

In order to achieve these objects, a motor-powered drive device according to the present invention has an electric motor, an output gear, a plurality of stepped gears for transmitting drive power of the motor to the output gear, a clutch rotor having one end coupled to the output gear and the other end provided with a magnetic attracting plane, an output shaft rotatably supporting the rotor, a movable clutch plate coupled to the output shaft through a return spring in facing relation to the magnetic attracting plane of the rotor, a clutch coil for magnetically coupling the magnetic attracting plane of the clutch rotor to the movable clutch plate when electric current flows therethrough and a rotary lever for winding a load driving wire up on one end of the output shaft, wherein a base plate is provided between a reduction gear mechanism composed of the stepped gear and the output gear and an electromagnetic clutch composed of the clutch rotor and the movable clutch plate for partitioning therebetween so that grease lubricant on the output gear can not be moved to the magnetic attracting plane of the rotor.

Further, non-magnetic members having small magnetic permeability are disposed between the clutch rotor and the output shaft and between end faces of the clutch rotor and the flange, respectively, so that magnetic flux from the clutch coil is blocked by the non-magnetic members, reducing leakage to the output shaft and the flange. Thus, the effective magnetic flux in the clutch rotor and the movable clutch plate is increased, increasing the transmission torque of the electromagnetic clutch.

A motor-powered drive device according to the present invention includes a stopper protrusion portion provided on a portion of the movable clutch plate which is engageable with stoppers provided on the housing to restrict rotation angle of the rotary lever. A stop torque of the motor does not act on the return spring as a compression force while a tension force due to an external load acts on the return spring. Therefore, there is no buckling of the spring.

In another embodiment according to the present invention a one-way clutch is further provided, which does not couple for a torque in a direction in which the return spring is compressed and transmits the torque when it is in a stretching direction.

When the motor is driven with the electromagnetic clutch coupled, the drive force of the motor is transmitted through a plurality of stepped gears to the output gear and then through the electromagnetic clutch to the output shaft. In this case, the one-way clutch engages due to a torque in a stretching direction of the return spring of the electromagnetic clutch to transmit it through the output shaft to the rotary lever and disengages due to a torque by which the return spring is compressed. Thus, a rotary drive of the rotary lever within the rotational range and a large compressive force is prevented from being exerted on the return spring when the rotation is stopped.

DETAILED DESCRIPTION OF THE PREFERRED EMBODIMENTS

Figures 1, 2:
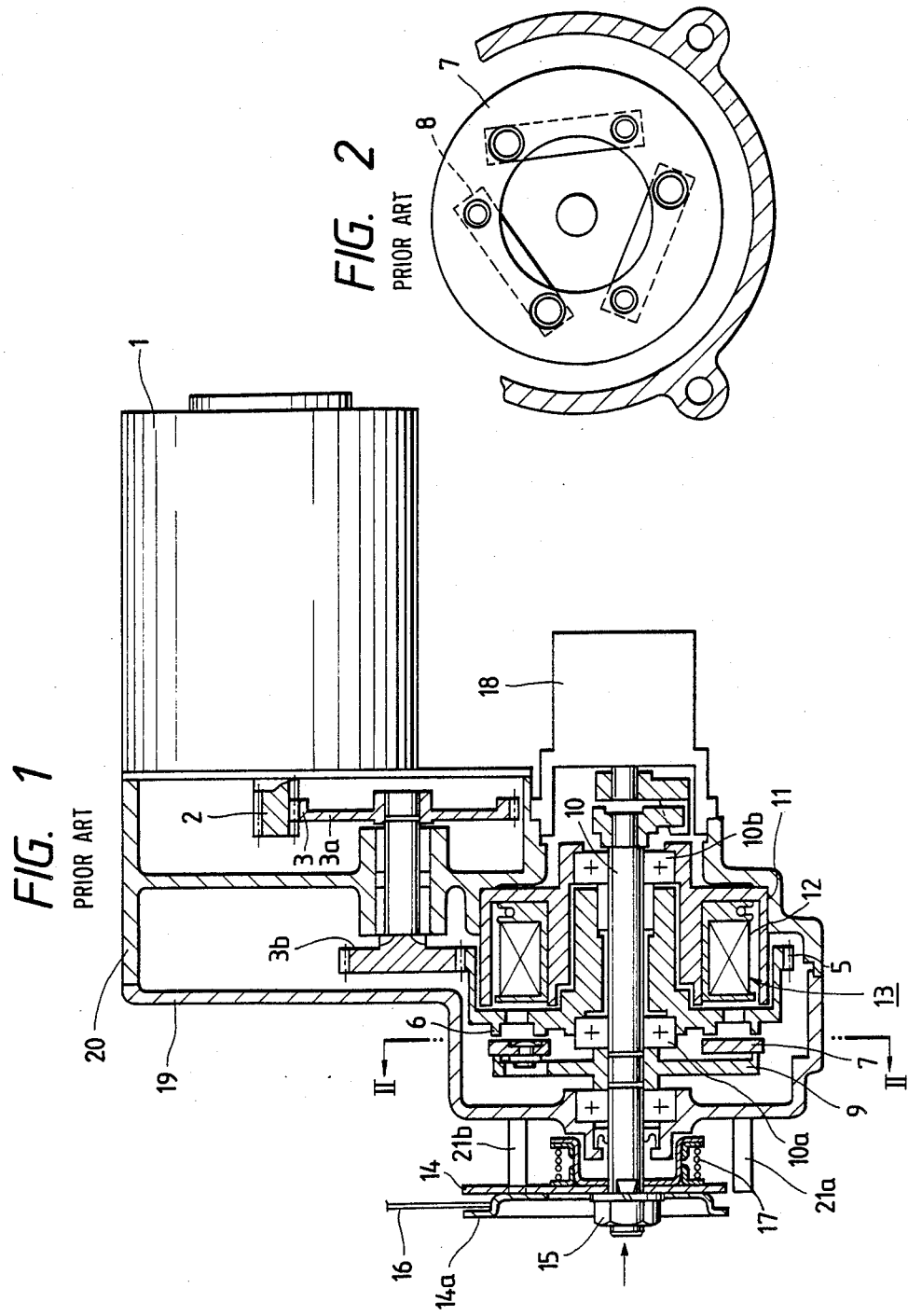
FIG. 1 is a cross section of a conventional motor-powered drive device.
FIG. 2 is a cross section taken along a line II—II in FIG. 1.
Figure 4:
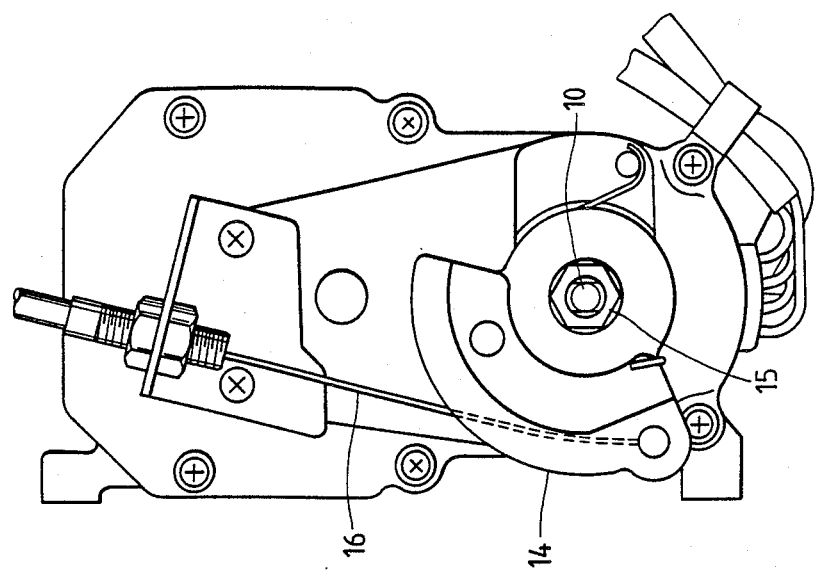
FIG. 4 is a front view of the embodiment in FIG. 3.
Figure 3:
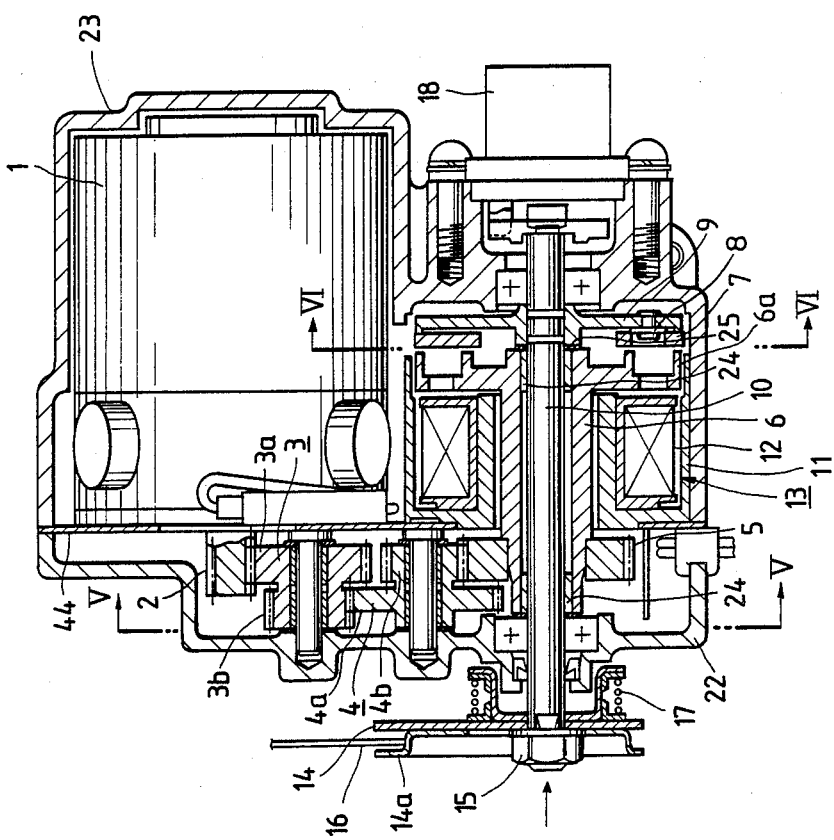
FIG. 3 is a cross section of a motor-powered drive device according to an embodiment of the present invention.

An embodiment of the present invention will be described. FIG. 3 is a cross section of a motor-powered drive device according to an embodiment of the present invention and FIG. 4 is a front view thereof. In FIG. 3, a motor 1 has an output shaft on which a pinion 2 is mounted or formed integrally. A first stepped gear 3 includes a large gear 3a meshed with the pinion 2 and a small gear 3b meshed with a large gear 4a of a second stepped gear 4, a small gear 4b which meshes with an output gear 5. The pinion 2, the first and the second stepped gears 3 and 4 and the output gear 5 constitute a reduction gear mechanism.

A tubular clutch rotor 6 has one end mounting the output gear 5 and the other end formed with a magnetic attracting plane 6a and rotatably supported by an output shaft 10. A movable clutch plate 7 faces toward the rotor 6 and is mounted on a side end of a flange 9 fixed to the output shaft 10, through a return spring 8 (also see FIG. 6).

A clutch yoke 11 is mounted around the clutch rotor 6 and a coil 12 is wound on the yoke 11 and forms a magnetic circuit of the electromagnetic clutch 13.

A housing 22 in the side of the reduction gear mechanism 4 and a housing 23 in the side of the motor 1 and the electromagnetic clutch 13 are provided as shown.

Figure 6:
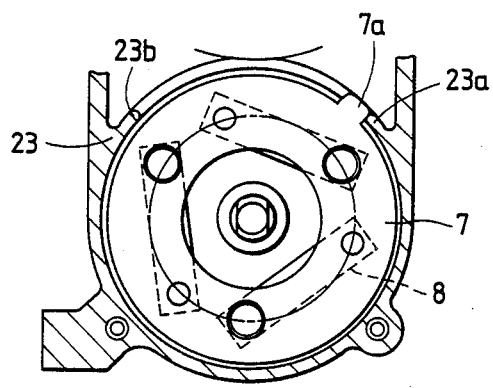
FIG. 6 is a cross section taken along a line VI—VI in FIG. 3.

As shown in FIG. 6 which is a cross section taken along a line VI—VI in FIG. 3, the movable clutch plate 7 is formed thereon with a protrusion 7a which, together with stoppers 23a and 23b formed on the housing 23, serves to restrict a rotation angle of the output shaft 10.

A rotary lever 14 is fixed by a nut 15 to one end of the output shaft 10 as shown in FIG. 4 and has a groove 14a in which a wire 16 is wound for driving an external load such as a throttle valve of an internal combustion engine. A return spring 17 for biasing the rotary lever 14 in a clockwise direction when viewed in the direction of the arrow in FIG. 3.

A potentiometer 18 is coupled with the output shaft 10 and has a resistance value variable correspondingly to the rotation angle of the output shaft 10.

A base plate 44 is provided between the housings 22 and 23 to partition the reduction gear mechanism 4 composed of the pinion 2 of the motor, the first and the second stepped gears 3 and 4 and the output gear 5 from the electromagnetic clutch portion 13 composed of the magnetic attracting plane 6a of the clutch rotor 6 and the movable clutch plate 7.

Slide bearings 24 of non-magnetic materal having a small magnetic permeability are mounted on an inner diametrical surface in the left and right ends of the clutch rotor 6 to rotatably support it with respect to the output shaft 10. A washer 25 of a similar non-magnetic material is arranged between the clutch rotor 6 and the flange 9.

A portion of magnetic flux produced by the current flowing through the clutch coil 12 is blocked by the slide bearings 24 of non-magnetic material disposed between the clutch rotor 6 an the output shaft 10 and the washer 25 of non-magnetic material disposed between the clutch rotor 6 and the flange 9. Therefore, the flux leakage to the output shaft 10 and the flange 9 is substantially reduced. As a result, almost all of the magnetic flux passes through the attracting plane of the rotor 6 and the movable clutch plate 7, resulting in an improvement of the magnetic attracting force of the electromagnetic clutch.

Figure 5:
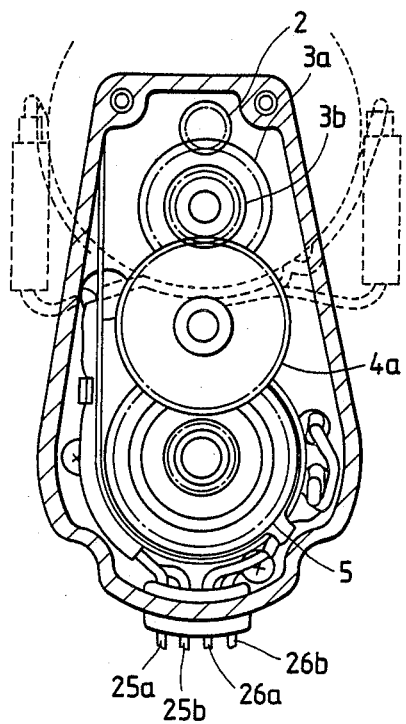
FIG. 5 is a cross section taken along a line V—V in FIG. 3.

The operation will now be described. When a voltage is applied through lead wires 25a, 25b (FIG. 5) to the motor 1, the latter rotates and a rotational output thereof is transmitted through the pinion 2, the first and the second stepped gears 3 and 4 to the output gear 5. In such a state, the clutch rotor 6 freely rotates with respect to the output shaft 10 when no current flows through the coil 12 of the electromagnetic clutch 13 and, thus, a rotational force is not transmitted to the output shaft 10.

When a current flows through external lead wires 26a and 26b (FIG. 5) and the coil 12, the movable clutch plate 7 is attracted magnetically by the rotor 6, so that rotation of the rotor 6 is transmitted through the movable clutch plate 7 and the flange 9 to the output shaft 10. In the case where a control amount of a control circuit (not shown) becomes coincident to a desired value during a process for making a rotation angle of the output shaft, it is possible to restrict the rotation angle of the output shaft 10 by means of the protrusion 7a of the movable clutch plate 7 and the stoppers 23a, 23b. Particularly, in this invention, since the reduction gear mechanism and the electromagnetic clutch portion are partitioned by the base plate 44, there is no movement of grease lubricant from the first and the second stepped gears 3 and 4 and the output gear 5 to the magnetic attracting plane 6a and the movable clutch plate 7 of the electromagnetic clutch 13. Therefore, the reduction of the magnetic coupling force of the electromagnetic clutch 13 is avoided.

In this embodiment in which the reduction gear mechanism is separated from the electromagnetic clutch portion by the base plate, there is no movement of grease from the side of the reduction gear mechanism to the electromagnetic clutch side, resulting in an improvement of reliability of the electromagnetic clutch. Further, it may be possible to mount the motor, the reduction gear mechanism and the electromagnetic clutch on the base plate, in such case the meshing accuracy of the gears is improved and abrasion or degradation of the gears can be prevented.

Further, with the non-magnetic members arranged between the clutch rotor and the output shaft and between the clutch rotor and the flange, flux leakage is substantially reduced, resulting in a substantial improvement of the magnetic coupling force of the electromagnetic clutch, i.e., the transmission torque. Further, it is possible to minimize the size of the electromagnetic clutch and to reduce power consumption.

Further, with the protrusion 7a formed on the movable clutch plate 7 and the stoppers 23a and 23b formed on the housing 23, the stopper protrusion 7a of the movable clutch plate 7 abuts against the stopper 23a or 23b to restrict an over-rotation of the output shaft 10 when a desired value of the output shaft 10 is set close to either end of the a rotatable range and an amount of over-rotation of the rotary lever 14 is large. In this case, although a drive torque of the motor acts on the pinion 2, the first and second stepped gears 3 and 4, the output gear 5 and the clutch rotor 6, only a tension force due to an external load acts on the return spring 8 (i.e., not in a compression direction). A transmission torque of the electromagnetic clutch 13 is set to a value which is larger than the external load drive torque and smaller than bending stress and permissible face pressure stress of the gear.

Therefore, the stop torque of the motor produced when a rotation of the motor is restricted by an abutment of the movable clutch plate against the stopper for an over rotation of the rotary lever does not act on the return spring and thus the buckling thereof is prevented, resulting in a highly reliable motor-powered drive device.

Figure 7:
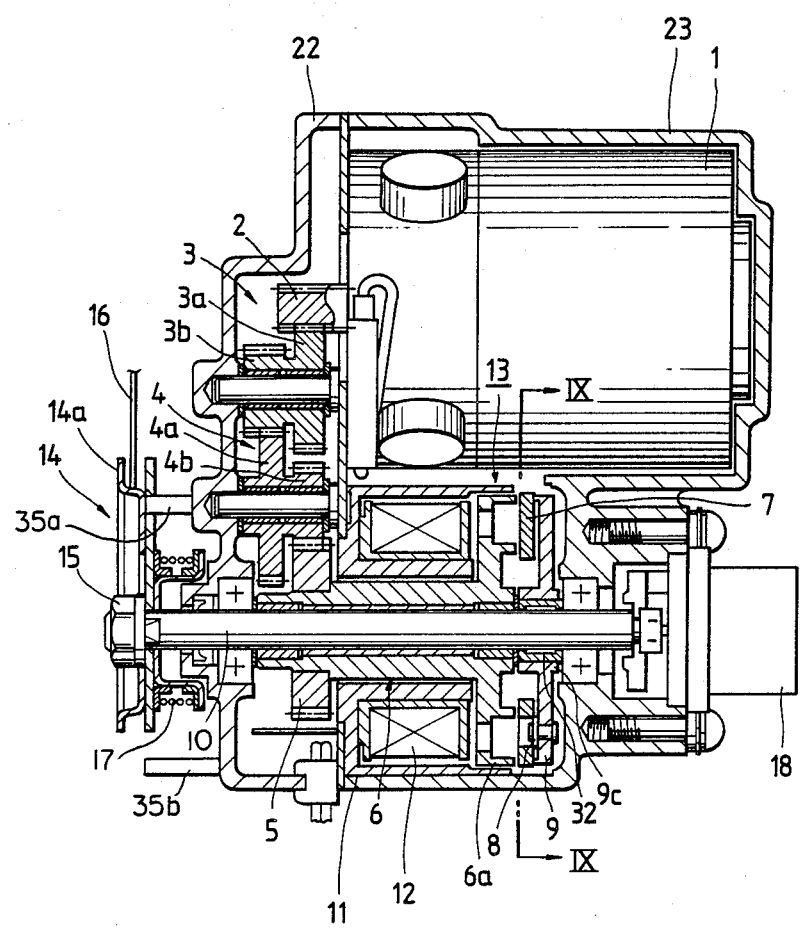
FIG. 7 is a cross section of another embodiment of the present invention.
Figure 8:
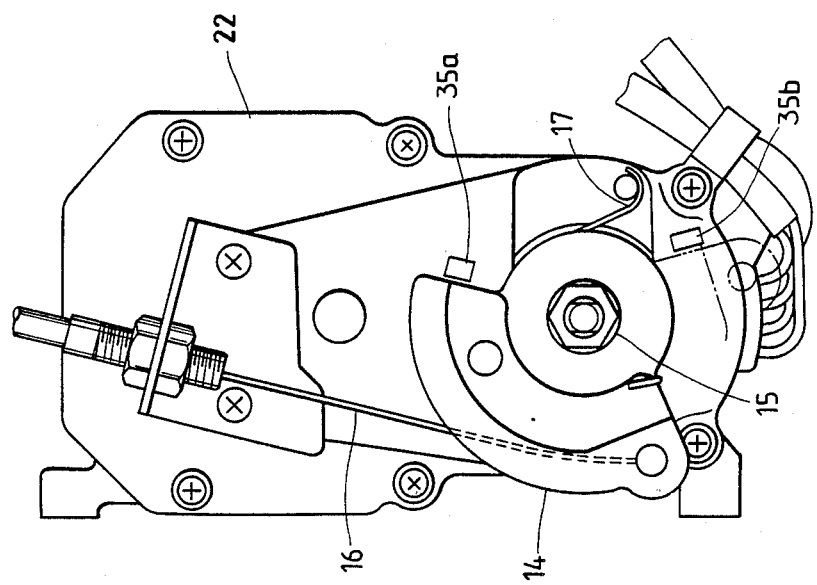
FIG. 8 is a front view of the embodiment in FIG. 7.

FIG. 7 shows another embodiment of the present invention and FIG. 8 is a side view thereof.

In FIGS. 7 and 8, a motor-powered drive device of this embodiment has a construction which is substantially the same as that of the device shown in FIG. 3.

Figure 9:
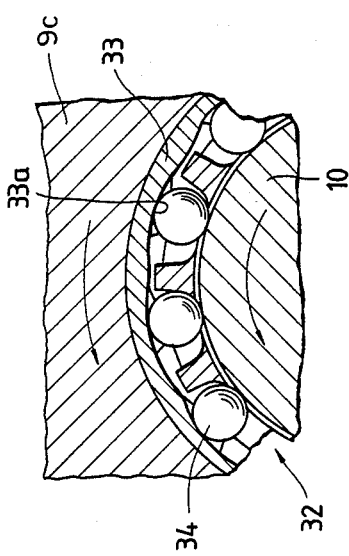
FIG. 9 shows a cross section taken along a line IX—IX in FIG. 7.
Figure 10:
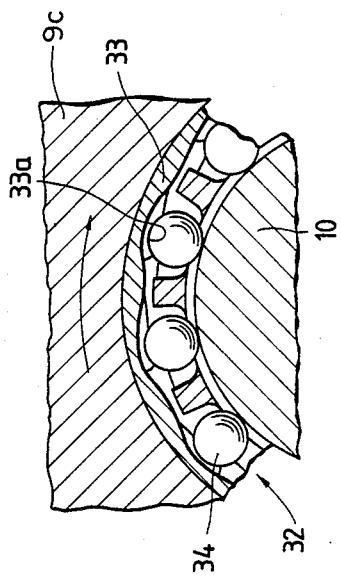
FIG. 10 is a similar cross section to that in FIG. 9, showing an operation of a one-way clutch.

In this embodiment, a one-way clutch 32 is provided in a coupling portion between an output shaft 10 and a flange 9 which supports a movable clutch plate 7. The one-way clutch 32 includes, as shown in FIGS. 9 and 10, an outer ring 33 formed in an inner surface with a plurality of wedge faces 33a and a plurality of needle rollers 34 arranged between the outer ring 33 and the output shaft 10. The outer ring 33 is fitted in a boss portion 9c of the flange 9 which supports clutch plate 7.

Within a movable range defined by stoppers 35a and 35b shown in FIG. 8, the output shaft 10 and a rotary lever 14 fixed thereto are rotated by drive force of the motor 1 in a counterclockwise direction in FIG. 8 and thus drive an external load such as throttle valve through a wire 16 for external load drive. In clockwise direction, they are returned by the drive force of the motor and the return coil spring 17. The operation of the one-way clutch during movement within the movable range is as follows.

When the clutch plate 7 is rotated in counterclockwise direction by the motor 1 through the movable clutch plate being attracted to the clutch rotor 6, the needle rollers 34 within the one-way clutch 32 enter into the wedge faces 33a of the outer ring 33 and mesh therewith by the relative rotation of the ring 33 coupled to the clutch plate 7 and the output shaft 10 as shown in FIG. 9. Thus, the torque transmission is possible. In this state, a stretching force is exerted on the return spring 8. When the clutch plate 7 is rotated in clockwise direction by the motor 1, the output shaft 10 rotates in a clockwisely by the return coil spring 17. However, if the relative rotational speed of the output shaft 10 is large with respect to the clutch plate 7, it rotates in a state where the needle rollers 34 are fitted in the wedge faces 33a. In this case, also, a stretching force is exerted on the return spring 8. However, if the relative speed of the output shaft 10 is small with respect to the clutch plate 7, the needle rollers 34 are relieved from the wedge faces 33a and thus the clutch plate over-runs. In this case, neither a stretching nor a compressive force is exerted on the spring 8.

On the contrary, when the rotary lever 14 is rotated in a clockwise direction and a clockwise torque is applied to the output shaft by the motor 1 after abutting with the stopper portion 35a due to an over-run, the needle rollers 34 are relieved from the wedge faces 33a as shown in FIG. 10 and rotate freely around the output shaft 10 which is now stationary. Therefore, neither a stretching nor a compressing force is applied to the return spring at this time.

The present invention is not limited to the mentioned embodiment and can be employed in various forms.

Since the present invention is constructed as mentioned above, there is no compression force applied to the return spring of the electromagnetic clutch even if the rotary lever which drives an external load abuts against the stopper portion due to an over-run. Therefore, it is possible to prevent a deformation of the return spring due to buckling and thus the reliability of the electromagnetic clutch is improved.

What is claimed is:

1. A motor-powered drive device comprising: an electric motor; a plurality of stepped gears; an output gear, whereby drive power of said motor is transmitted through said stepped gears to said output gear, said stepped gears and said output gear constituting a reduction gear mechanism; a tubular clutch rotor having said output gear fixedly mounted on one axial end, and an opposite end provided with a magnetic attracting plane; an output shaft rotatably supporting said clutch rotor; a movable clutch plate supported by return springs on a flange mounted on said output shaft, said clutch plate being in facing relation to said magnetic attracting plane of said clutch rotor; a clutch coil for magnetically coupling said magnetic attracting plane of said clutch rotor to said movable clutch plate when electric current flows therethrough, said magnetic attracting plane of clutch rotor and, said movable clutch plate constituting an electromagnetic clutch portion; a rotary lever means for winding-up a load driving wire, said rotary lever means being fixed to one end of said output shaft; and a base plate means for partitioning said reduction gear mechanism and said electromagnetic clutch portion.

2. The motor-powered drive device as claimed in claim 1, wherein non-magnetic members having small magnetic permeability are disposed between said clutch rotor and said output shaft and between end faces of said clutch rotor and said flange, respectively.

3. The motor-powered drive device as claimed in claim 2 wherein said non-magnetic members disposed between said clutch rotor and said output shaft comprise non-magnetic slide bearings.

4. The motor-powered drive device as claimed in claim 2 or 3, wherein said non-magnetic member disposed between said end faces of said clutch rotor and said flange comprises a non-magnetic washer.

5. The motor-powered drive device as claimed in claim 1 or 2, wherein a stopper protrusion portion is provided on a portion of said movable clutch plate and engageable with stoppers provided on a housing of the device to restrict a rotation angle of the rotary lever.

6. The motor-powered drive device as claimed in any of claims 1 or 2, wherein a one-way clutch is provided between said output shaft and said flange, said one-way clutch being adapted to allow said movable clutch plate to rotate freely with respect to said output shaft with a torque in a direction in which said return spring is compressed and to engage said movable clutch with said output shaft to transmit a torque when the latter torque is in a direction in which said return spring is stretched.

7. The motor-powered drive device as claimed in claim 6, wherein said one-way clutch comprises a ring having an outer surface fixed to said flange and an inner surface formed with a plurality of wedge grooves and a plurality of needle rollers received in said wedge grooves of said ring.

* * * * *